(12) United States Patent
Koh

(10) Patent No.: US 11,225,313 B2
(45) Date of Patent: Jan. 18, 2022

(54) SPACER ASSEMBLY FOR AIRCRAFT FLOORING

(71) Applicant: Techno-Coatings, Inc., North Miami, FL (US)

(72) Inventor: Tuan Huat Jerry Koh, North Miami, FL (US)

(73) Assignee: Techno-Coatings, Inc., North Miami, FL (US)

( * ) Notice: Subject to any disclaimer, the term of this patent is extended or adjusted under 35 U.S.C. 154(b) by 0 days.

(21) Appl. No.: 16/774,641

(22) Filed: Jan. 28, 2020

(65) Prior Publication Data

US 2020/0239121 A1    Jul. 30, 2020

Related U.S. Application Data

(60) Provisional application No. 62/797,832, filed on Jan. 28, 2019.

(51) Int. Cl.
*B64C 1/18* (2006.01)
*E04F 15/02* (2006.01)
*B63B 17/00* (2006.01)

(52) U.S. Cl.
CPC ............... *B64C 1/18* (2013.01); *B63B 17/00* (2013.01); *E04F 15/02005* (2013.01); *E04F 15/02016* (2013.01)

(58) Field of Classification Search
CPC .............................. B64C 1/18; E04F 15/02016
See application file for complete search history.

(56) References Cited

U.S. PATENT DOCUMENTS

| 3,353,314 A | 11/1967 | Melcher |
| 5,046,690 A | 9/1991 | Nordstrom |
| 5,363,579 A | 11/1994 | Plumly |
| 5,806,270 A | 9/1998 | Solano et al. |
| 7,121,052 B2 | 10/2006 | Niese et al. |

(Continued)

FOREIGN PATENT DOCUMENTS

| CA | 2079607 A1 | 10/1991 |
| CA | 3004249 A1 | 1/2019 |

(Continued)

OTHER PUBLICATIONS

Jan. 22, 2020—(PCT) WO and ISR—App. No. PCT/US19/854106.

(Continued)

*Primary Examiner* — Babajide A Demuren
(74) *Attorney, Agent, or Firm* — Banner & Witcoff, Ltd.

(57) ABSTRACT

A spacer assembly for flooring systems, such as for aircraft flooring, includes a spacer panel and one or more flooring panels. The spacer panel includes a core layer and a bottom layer. The core layer has a top face and a bottom face and the bottom layer has a lower face and an upper face that is bonded to the bottom face of the core layer. The lower face of the bottom layer is located adjacent to a structural floor and the bottom layer slides over the structural floor. The one or more flooring panels connect to the top face of the core layer, where the flooring panel and the spacer panel slide over the structural floor. Two or more flooring panels can be connected, such as by an adhesive material, to a spacer panel with a sealant member between the flooring panels to avoid infiltrations of liquids.

14 Claims, 11 Drawing Sheets

(56) References Cited

U.S. PATENT DOCUMENTS

| | | |
|---|---|---|
| 7,677,005 B2 | 3/2010 | Pervan |
| 7,967,251 B2 | 6/2011 | Wood |
| 7,988,809 B2 | 8/2011 | Smith et al. |
| 10,836,463 B2 | 11/2020 | Mills et al. |
| 2002/0046527 A1 | 4/2002 | Nelson |
| 2002/0095897 A1 | 7/2002 | Summerford |
| 2007/0283654 A1 | 12/2007 | Stanchfield et al. |
| 2008/0005993 A1 | 1/2008 | Su |
| 2008/0014399 A1* | 1/2008 | Martin .................. B29C 66/919 428/57 |
| 2009/0038254 A1 | 2/2009 | Steele et al. |
| 2009/0151291 A1 | 6/2009 | Pervan |
| 2011/0131901 A1 | 6/2011 | Pervan et al. |
| 2013/0092793 A1 | 4/2013 | Braeutigam |
| 2014/0033635 A1 | 2/2014 | Pervan et al. |
| 2014/0157700 A1 | 6/2014 | Martensson |
| 2016/0060880 A1* | 3/2016 | Stover ............... E04F 15/02044 52/582.2 |
| 2017/0254096 A1 | 9/2017 | Pervan |
| 2017/0297713 A1 | 10/2017 | Hegenbart et al. |
| 2018/0038114 A1 | 2/2018 | Palsson |
| 2018/0194451 A1 | 7/2018 | Cosby et al. |
| 2018/0327074 A1 | 11/2018 | Mills et al. |
| 2018/0355620 A1* | 12/2018 | Pervan ...................... B32B 5/14 |
| 2019/0009882 A1 | 1/2019 | Mills et al. |
| 2019/0177983 A1 | 6/2019 | Klein |
| 2019/0276133 A1 | 9/2019 | Hesslewood et al. |
| 2019/0277041 A1* | 9/2019 | Pervan .............. E04F 15/02044 |
| 2019/0383026 A1* | 12/2019 | Bergelin ........... E04F 15/02016 |
| 2020/0239123 A1 | 7/2020 | Stegmiller et al. |
| 2020/0240151 A1 | 7/2020 | Koh |
| 2020/0331582 A1 | 10/2020 | Hesslewood |

FOREIGN PATENT DOCUMENTS

| | | | |
|---|---|---|---|
| DE | 29609590 U1 | 7/1996 | |
| EP | 3424812 A1 | 1/2019 | |
| JP | H10183965 A | 7/1998 | |
| WO | 2000020705 A1 | 4/2000 | |
| WO | WO-0020705 A1 * | 4/2000 | ........ E04F 15/02038 |
| WO | 2014195548 A1 | 12/2014 | |
| WO | 2017197503 A1 | 11/2017 | |

OTHER PUBLICATIONS

May 22, 2020—(PCT) WO and ISR—App. No. PCT/US20/15479.
Apr. 21, 2020—(PCT) WO and ISR—App. No. PCT/US20/15475.
Apr. 27, 2020—(PCT) WO and ISR—App. No. PCT/US20/15473.

* cited by examiner

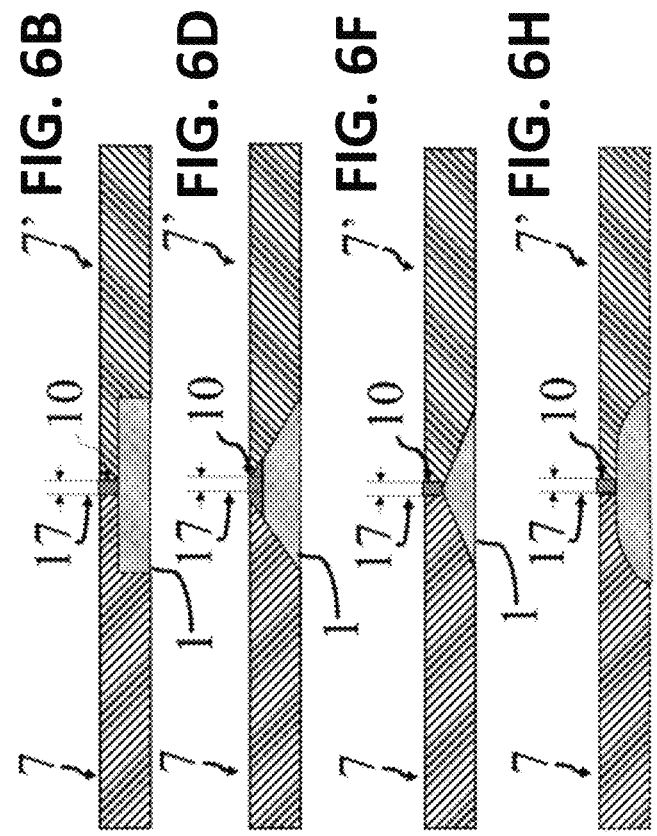
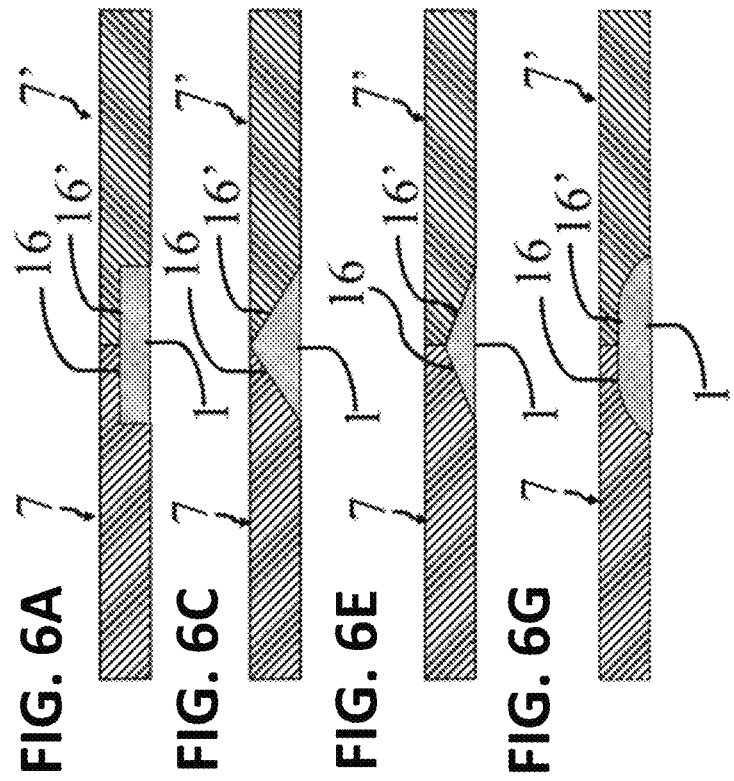

SPACER ASSEMBLY FOR AIRCRAFT FLOORING

CROSS REFERENCE TO RELATED APPLICATION(S)

This application claims priority to U.S. Provisional Patent Application No. 62/797,832, filed Jan. 28, 2019, and entitled "SPACER ASSEMBLY FOR AIRCRAFT FLOORING," which is incorporated herein by reference in its entirety.

BACKGROUND

The present disclosure relates to spacer assemblies for aircraft flooring which is located between flooring panels.

Spacer panels in in vehicle flooring applications, such as in aircraft flooring applications, refer to elements and devices used for attaching and/or interconnecting flooring sections to produce the appearance and behavior of a monolithic vehicle flooring system, without the need to sequence the installation and/or without removal of individual flooring sections.

SUMMARY

This disclosure discloses a spacer assembly for vehicle flooring systems, such as for aircraft flooring, and comprising a spacer panel and a flooring panel. The spacer panel may include a top face operatively disposed to receive the flooring panel, and a bottom face located facing the structural floor. The flooring panel and the bottom face of the spacer panel can slide over the structural floor. In an illustrative example, the disclosure describes a system that includes two or more flooring panels connected to the spacer panel, and a sealant member located between the flooring panels, where the sealant member prevents infiltrations of liquids spilled over the flooring panels that could reach the structural floor of the aircraft. In some cases, an adhesive material may be used to connect the flooring panels to the spacer panel. The spacer panel avoids overlapping unions between contiguous flooring panels and, accordingly, the spacer panel enables independent removal and/or installation of any flooring panel without the need to sequence their installation and/or removal.

BRIEF DESCRIPTION OF THE DRAWINGS

The present disclosure is illustrated by way of example and not limited in the accompanying figures in which like reference numerals indicate similar elements and in which:

FIGS. 6A-6H shows a plurality of cross-section views of the cut sections of the flooring panels and the form of the spacer panel, according to aspects of this disclosure;

DETAILED DESCRIPTION OF THE INVENTION

In the following description of various illustrative examples, reference is made to the accompanying drawings, which form a part hereof, and in which is shown, by way of illustration, various examples in which aspects of the disclosure may be practiced. It is to be understood that other configurations may be utilized, and/or structural and functional modifications may be made, without departing from the scope of the present disclosure.

Spacer panels can be useful in combination with the panels disclosed in co-pending pending U.S. patent application Ser. No. 16/590,038, entitled "Floating Floor Attachment System." This application discusses a system that allows installation of rigid flooring product to an interior space of a vehicle, such as an aircraft structural floor panel, via discrete floating attachment points that allow for a specific amount of displacement and prevent permanent deformation of the floor panel. This avoids deformations of the flooring panels during the movement of underlying aircraft floor support structures, which are caused by displacement from internal loads due to fuselage pressurization and flight maneuverers, as well as expansion and contraction due to temperature.

Figure 1:
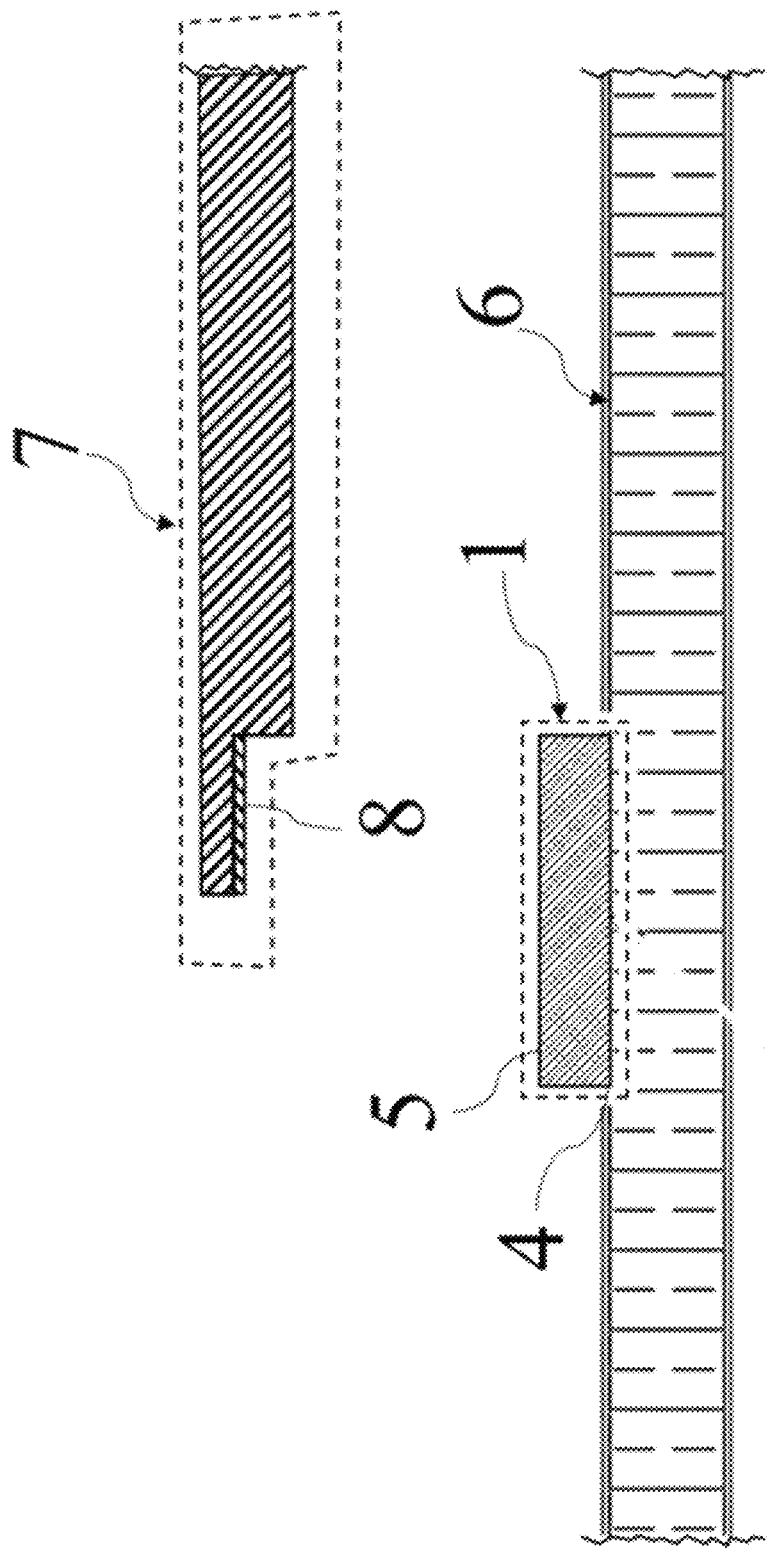
FIG. 1 shows a section view of an illustrative example showing an exploded detail of a flooring panel and a spacer panel according to aspects of this disclosure.

A spacer assembly for flooring applications may be used in a plurality of applications, such as in a building, an aircraft, or other vehicle. In some cases, aircraft flooring may be placed atop the structural flooring of the aircraft, and may include a spacer panel 1 and a flooring panel 7. Referring to FIG. 1, the flooring panel 7 may be located on a structural floor 6 of an aircraft, and the spacer panel 1 has a top face 5 operatively disposed to receive the flooring panel 7, and a bottom face 4 opposite the top face and located adjacent to the structural floor 6. The flooring panel 7 and the bottom face 4 of the spacer panel 1 can slide over the structural floor 6. Accordingly, the spacer panel 1 allows for connecting and/or disconnecting a flooring panel 7 without removing any contiguous element that could be overlapped with the flooring panel 7.

Figure 2:
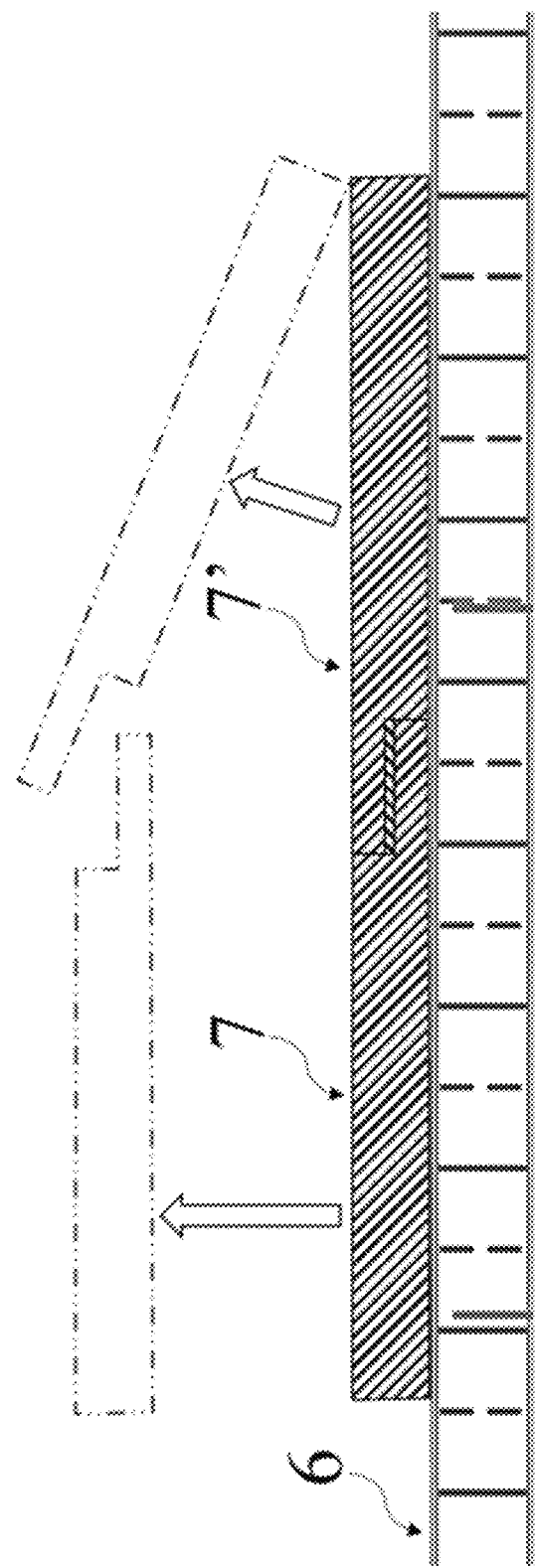
FIG. 2 shows a section view of two flooring panels connected together by an overlap according to aspects of this disclosure.

For example, referring to FIG. 2, if a flooring panel 7 is connected to a flooring panel 7' by an overlapping connection, often, removal of the flooring panel 7' is required to allow for detachment of the flooring panel 7. Accordingly, with the overlapped connection between the flooring panels 7 and 7', more steps and/or more time is required when replacing a single flooring panel 7 in comparison with the spacer assembly including spacer panel 1 as described in this disclosure.

Figure 3:
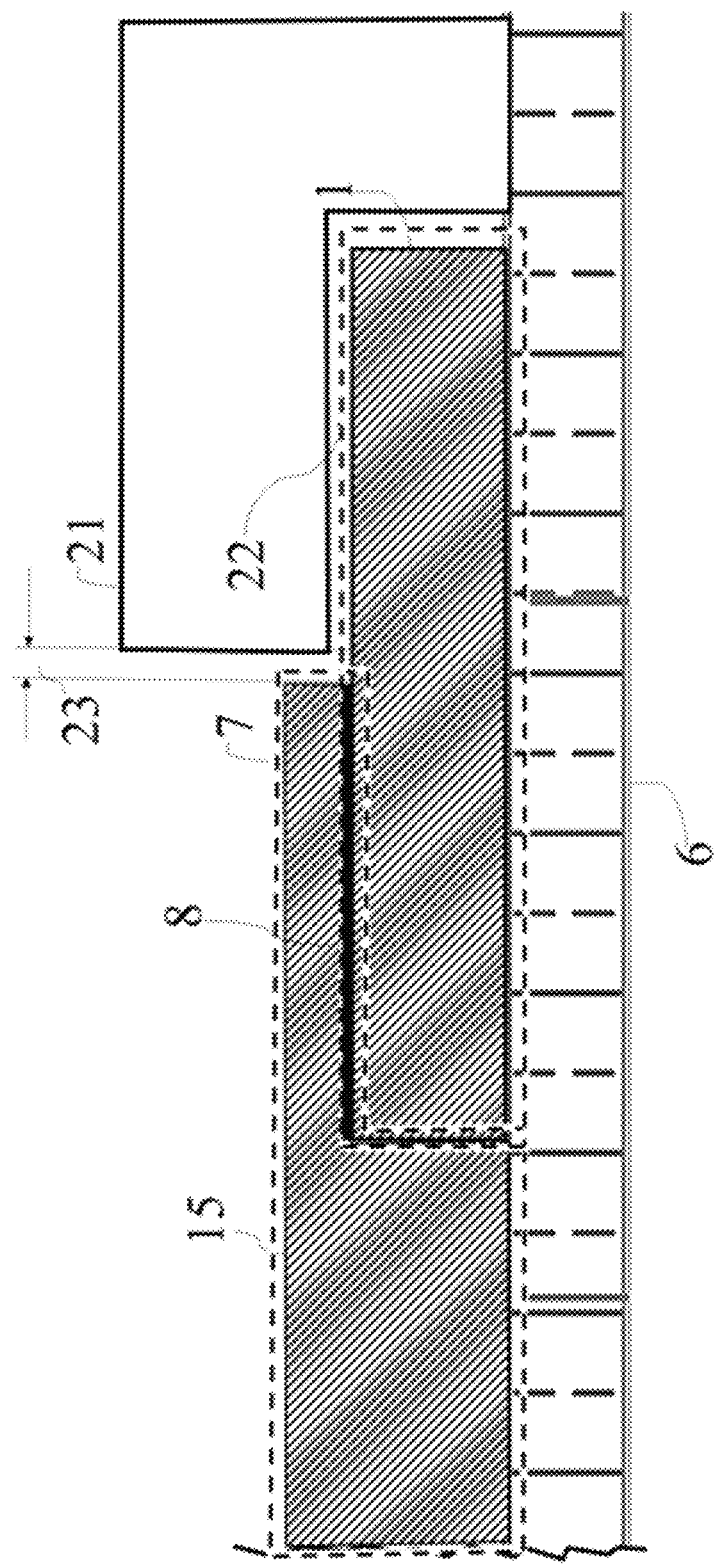
FIG. 3 shows a section view of a flooring panel attached to a spacer panel, where the spacer panel is located in a recessed cavity of a monument of an aircraft, according to aspects of this disclosure.

Referring to FIG. 3, the spacer panel 1 may be at least partially inserted in a recessed cavity 22 of a monument 21, where the monument 21 is connected to the structural floor 6 of an aircraft. Accordingly, a flooring panel 7 connected to the spacer panel 1 would have an edge located close to the monument 21 that forms a separation 23. The separation 23 provides tolerance to the flooring panel 7 and that allows the flooring panel 7 a lateral displacement produced by forces due to pressurization of the aircraft and/or flying maneuvers, to dynamic loads such as inertia, vibration, slosh dynamics of fluids, and/or to ground loads due to adverse braking or maneuvering during taxiing. Accordingly, the separation 23 prevents compression forces parallel to the length of the flooring panel 7 that may cause deformations and buckling.

Similarly, in some cases, not illustrated, the spacer panel 1 may be thicker than the recessed cavity 22 of the monument 21. In such cases and during the installation, in order for the spacer panel 1 to extend under the monument 21 to avoid a visible gap, a portion of the top face 5 of the spacer panel 1 may be removed locally. For example, the thickness removal may be accomplished using mechanical means, such as by using a power planer or through additional trimming and reinforcement of the edge panel during the manufacturing process.

In some cases, referring to FIG. 1 and FIG. 3, the spacer panel 1 may be connected to the flooring panel 7 by an adhesive material 8.

The adhesive material 8 may be selected from adhesives such as, for example silicone adhesives, polymer adhesives, acrylonitrile, acrylic adhesives, cyanoacrylates, epoxy resins, epoxy putty, ethylene-vinyl acetate (EVA), polyvinyl butyral (PVB), polyvinyl acetate (PVA), polyester resins, polysulfides, polyurethane, polyvinyl alcohol, polyvinyl chloride (PVC), polyurethane tapes, butyl rubber tapes, neoprene adhesives, urethane adhesives, and/or combinations thereof.

In some cases, the adhesive material 8 may be a butyl rubber tape having adhesive on both faces. The adhesive may be deposited on a flexible backing, such as a polyethylene backing. Additionally, each face of the tape may be protected by a backing layer, which is removed during installation of the adhesive material 8 with the flooring panel 7 and the spacer panel 1.

In some cases, not illustrated, the spacer panel 1 and the flooring panel 7 may be connected by any mechanical fastening means. For example, the spacer panel 1 and the flooring panel 7 may be connected by mechanical fasteners such as bolts, screws, bolts, nuts, rivets, studs, pins, wedges, clamps, equivalent elements which are known by a skilled artisan, and combinations thereof.

Figure 4:
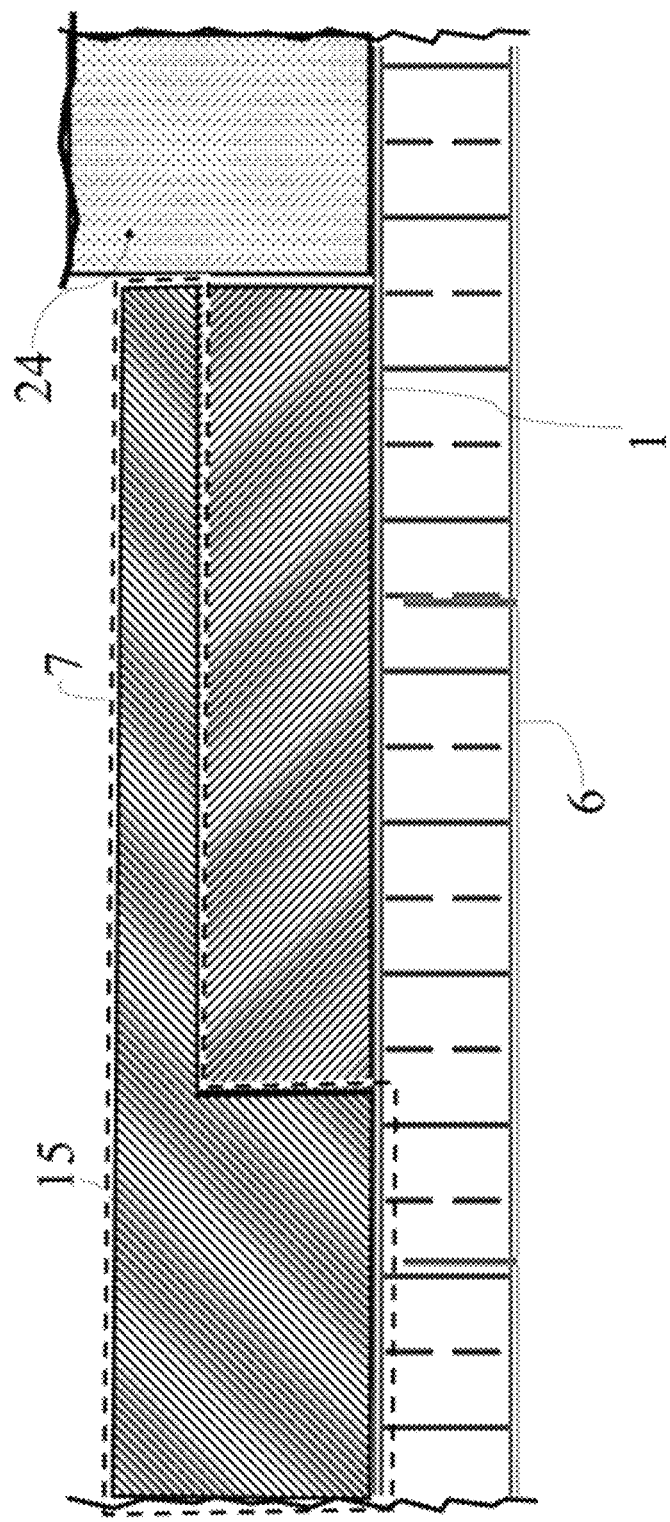
FIG. 4 shows a section view of a flooring panel attached to a spacer panel, where the spacer panel is located near a structural member of an aircraft, according to aspects of this disclosure.

In some cases, referring to FIG. 4, the flooring panel 7 may cover the entire spacer panel 1. For example, this configuration of the flooring panel 7 and the spacer panel 1 allows connecting the flooring panel 7 near a structural member 24 of the aircraft. A separation between the flooring panel 7 and the structural member 24 may be desired to avoid generating deformations due to lateral displacement produced by forces due to pressurization of the aircraft, to flying maneuvers, to dynamic loads such as inertia, vibration, slosh dynamics of fluids, and/or to ground loads due to adverse braking or maneuvering during taxiing.

Figure 5:
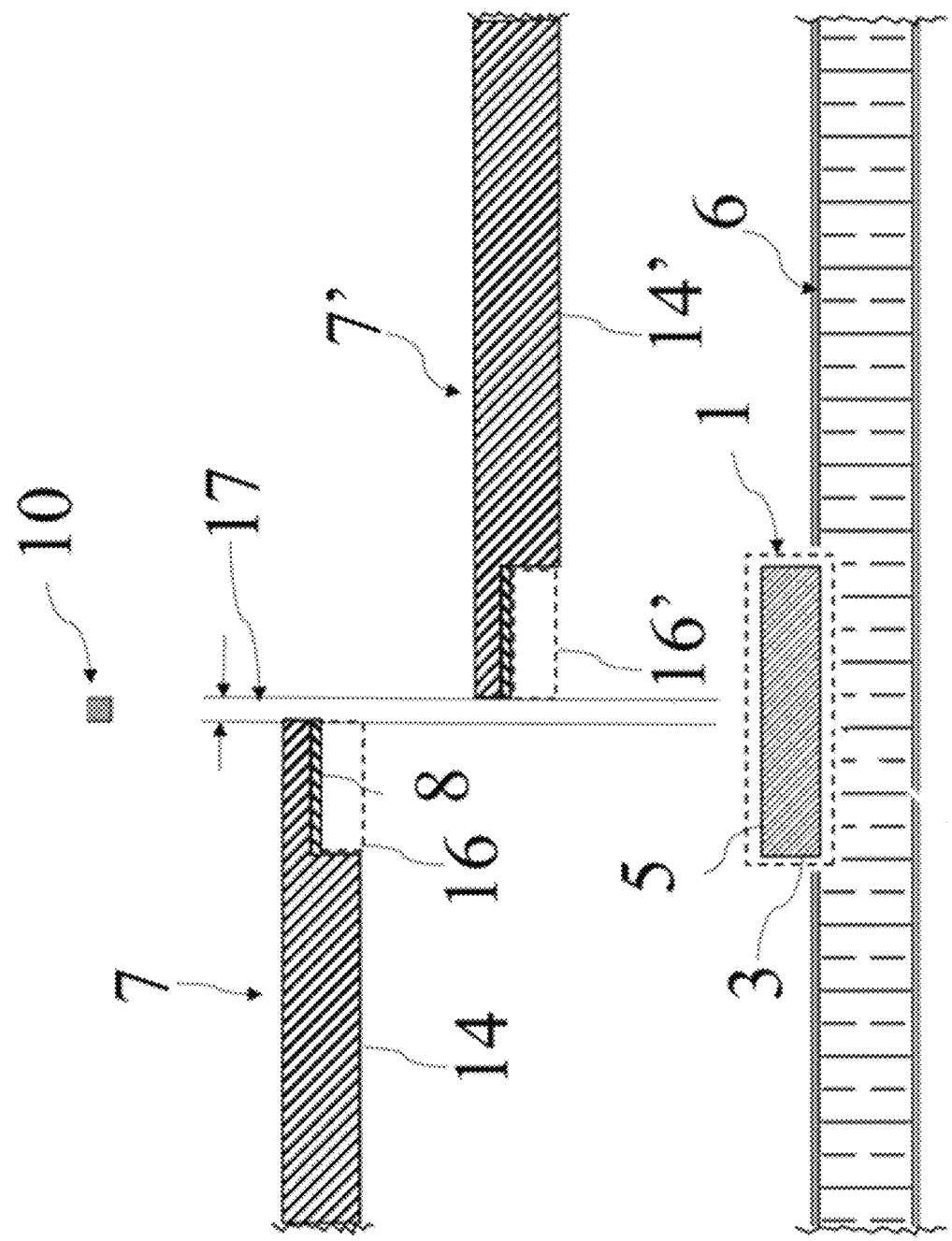
FIG. 5 shows a section view of two flooring panels, a sealant member and a spacer panel, according to aspects of this disclosure.

Referring to FIG. 5, the flooring panel 7 may include a cut section 16 located in the bottom face 4, where the cut section 16 contacts the top face 5 of the spacer panel 1. The cut section 16 and the top face 5 form a male-female connection.

Referring again to FIG. 5, the spacer assembly may include two flooring panels 7 and 7' connected to a spacer panel 1. Accordingly, the spacer panel 1 is installed between the two flooring panels 7 and 7' providing a continuous flooring surface and providing a rigid connection between the flooring panels 7 and 7'. Such configurations avoid overlaps of the flooring panels 7 and 7', as well as reduces the need for the use of mechanical fasteners such as bolts, rivets, or nails.

Making reference to FIG. 5, the flooring panels 7 and 7' may include at least one cut section 16 and 16' located along one of its edges. The edge where the cut section 16 of the flooring panel 7 is located contiguous to the cut section 16' of the contiguous flooring panel 7' that is connected to the spacer panel 1. In this manner, cut sections 16 and 16' generate a male-female connection with the spacer panel 1. The connection between the flooring panels 7 and 7' and the spacer panel 1 may be secured using the adhesive material 8. In some cases, the connection between the flooring panels 7 and 7' and the spacer panel 1 may be secured using mechanical fasteners such as bolts, screws, nuts, rivets, studs, pins, wedges, clamps, equivalent elements that are known by a skilled artisan, or combinations thereof.

Similarly, in a non-illustrated embodiment, the flooring panels 7 and 7' may be connected to the spacer panel 1 by snap-on fasteners and connections, such as bolt-tube connections, pin-hole connections, or other male-female connections known by a skilled artisan.

Referring to FIGS. 6A-6H, the flooring panels 7 and 7' may have a cut section 16 and 16' with different forms, such as rectangles, triangles, trapezoids, or trapezoids with curve edges. In other non-illustrated examples, the flooring panels 7 and 7' may have a cut section 16 and 16' having a form such as a hexagon, pentagon, octagon, triangle, parallelogram, or any other regular or irregular polygon.

Similarly, and also referring to FIGS. 6A-6H, the spacer panel 1 may have a form or shape that fits the form of the cut sections 16, 16' of the flooring panels 7, 7'. For example, the spacer panel 1 may be configured with a form such as a rectangle, a triangle, a trapezoid, or a trapezoid with curve edges, or combinations of such shapes. In other non-illustrated embodiments of the invention, the spacer panel 1 may have a form such as a hexagon, pentagon, octagon, triangle, parallelogram, or any other regular or irregular polygon.

As also shown in FIG. 5 and FIGS. 6A-6H, the flooring panels 7 and 7' form a gap 17 when connected to the spacer panel 1). In some cases, the gap 17 may be filled with a sealant member 10 that seals the gap 17 and prevents infiltrations of liquids spilled over the flooring panels 7 and 7' and that could reach the structural floor 6 of the aircraft. The infiltrations of liquid could cause damages in electric or electronic instruments and can increase corrosion risk to the aircraft. Additionally, the sealant member 10 may provide an elastic connection between the flooring panels 7 and may provide bending and/or shear resistance to the aircraft flooring.

In some cases, the sealant member 10 may be grouts of polyvinyl chloride, extruded polyvinyl chloride, extruded polymers, thermoplastic resins, epoxy resins, silicone, elastomeric gaskets, and combinations thereof. In some cases, the sealant member 10 can be made of a material selected from natural rubber, polyisoprene, polybutadiene, styrene-butadiene rubber, butyl rubber, or nitrile rubber.

In an illustrative example, the sealant member 10 may be a grout, where the grout is applied between the flooring panels 7 and 7'. The grout may be a polymeric material, which can be applied between the flooring panels 7, and 7' when connecting the flooring panels 7 and 7' to the spacer panel 1. The grout allows for filling of discontinuities, cracks, scratches and/or other surface defects of the flooring panels 7 and 7', Accordingly, the grout may provide an effective seal that avoids infiltrations of liquids in the interlayers of the flooring panels 7 and 7' when they are formed by laminated layers.

In some cases, the flooring panels 7 and 7' may form a gap 17 having a distance within a range, such as a range between 0 mm to 4.572 mm, between 1.143 mm to 4.572 mm, between 2.286 mm to 4.572 mm, between 1 mm and 5 mm, between 1 mm and 2 mm, between 1.2 mm and 1.5 mm, between 1.25 mm and 1.5 mm, between 1.1 mm and 1.7 mm, between 1.25 mm and 1.75 mm, between 1.3 mm and 1.75 mm, between 1.5 mm and 1.8 mm, between 1.2 mm and 2.5 mm, between 2 mm and 2.5 mm, between 2.2 mm and 2.5 mm, between 2.286 mm and 2.5 mm, between 2.5 mm and 3 mm, between 2 mm and 3.5 mm, or having a distance of more than 3.5 mm.

Similarly, the cut section 16 and 16' of the flooring panels 7 and 7' may extend inwardly from the edge by a distance, such as a distance between 6.35 mm and 25.4 mm, between 6.35 mm and 25.4 mm, between 8 mm and 10 mm, between 8 mm and 9 mm, between 10 mm and 13 mm, between 10 mm and 12.5 mm, between 10 mm and 15 mm, between 12.5 mm and 15 mm, between 12.5 mm and 19 mm, between 12.5 mm and 25.4 mm, between 12.5 mm and 30 mm, between 19 mm and 25.4 mm, between 25 mm and 35 mm, or having a distance of more than 35 mm. In some cases, the cut section of each flooring panel may have the same distance from the edge. In some cases, the cut sections 16 and 16' of the flooring panels 7 and 7' have different distances from the edge.

In some cases, the spacer panel 1 may have a length, as measured in the direction parallel to the distance of the cut section 16, where the length is within a range between 20 mm and 25 mm, between 25.4 mm and 28 mm, between 26 mm and 27 mm, between 27 mm and 29 mm, between 28 mm and 31 mm, between 20 mm and 30 mm, between 30 mm and 45 mm, between 20 mm and 55 mm, between 25.3 mm and 35 mm, between 35 mm and 45 mm, between 55 mm and 65 mm, or more than 65 mm. In some cases, the length measured in the direction parallel to the distance of the cut section 16 of the spacer panel 1 is the sum of the distances of the cut sections 16 and 16' in which they extend inwardly from the edge of the corresponding flooring panels 7 and 7'.

Figure 7:
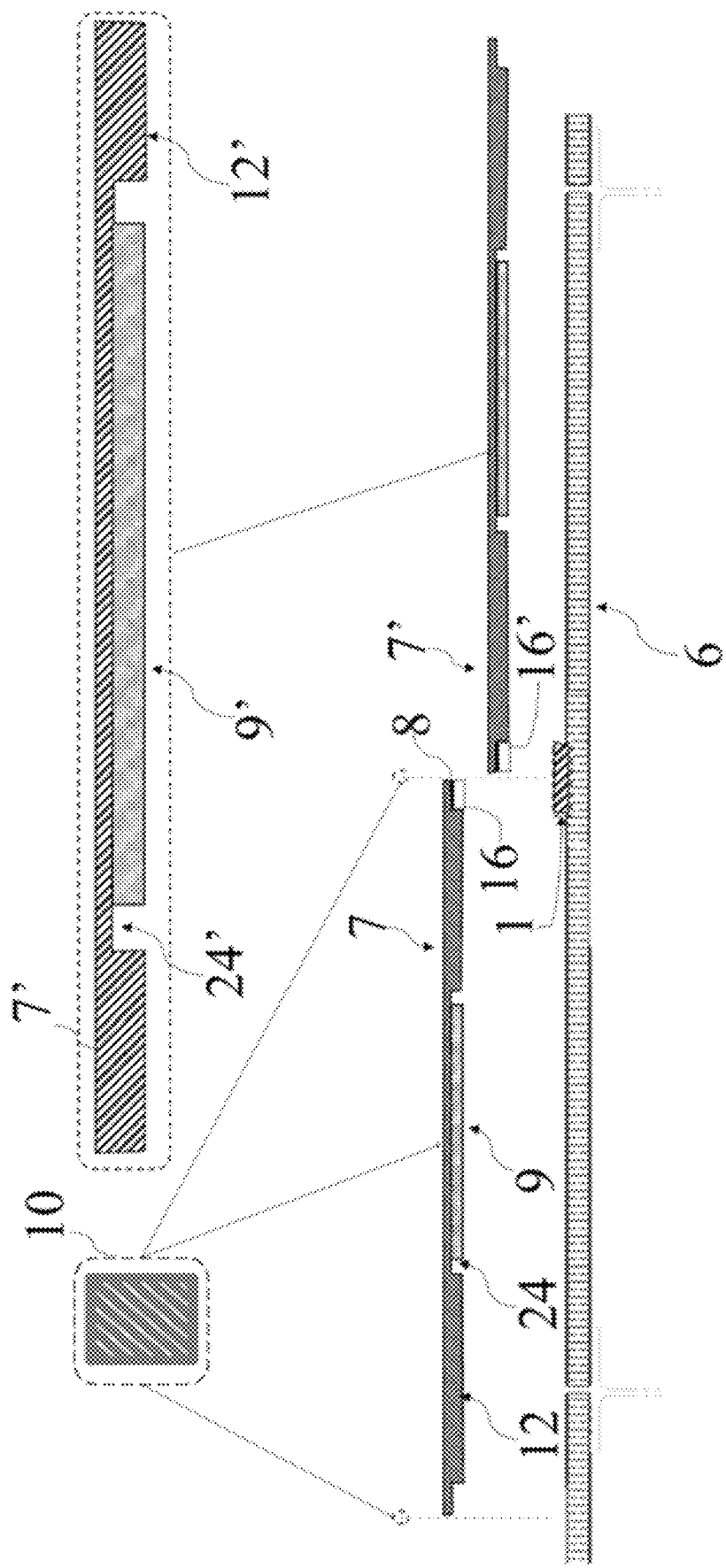
FIG. 7 shows a section view showing details of a sealant member, a spacer panel, and a flooring panel attached to a floor puck, according to aspects of this disclosure.

Referring to FIG. 7, the flooring panels 7 and 7' may include a panel housing 24 and 24' that is connected to a floor puck 9, where the floor puck 9 is attached to the structural floor 6 of the aircraft by adhesive means and/or fasteners. For example, the floor puck 9 is a floor puck such as the one described in the co-pending U.S. patent application Ser. No. 16/590,038. Accordingly, the floor puck 9 may provide a floating connection between the flooring panels 7 and 7' and the structural floor 6.

Figure 9:
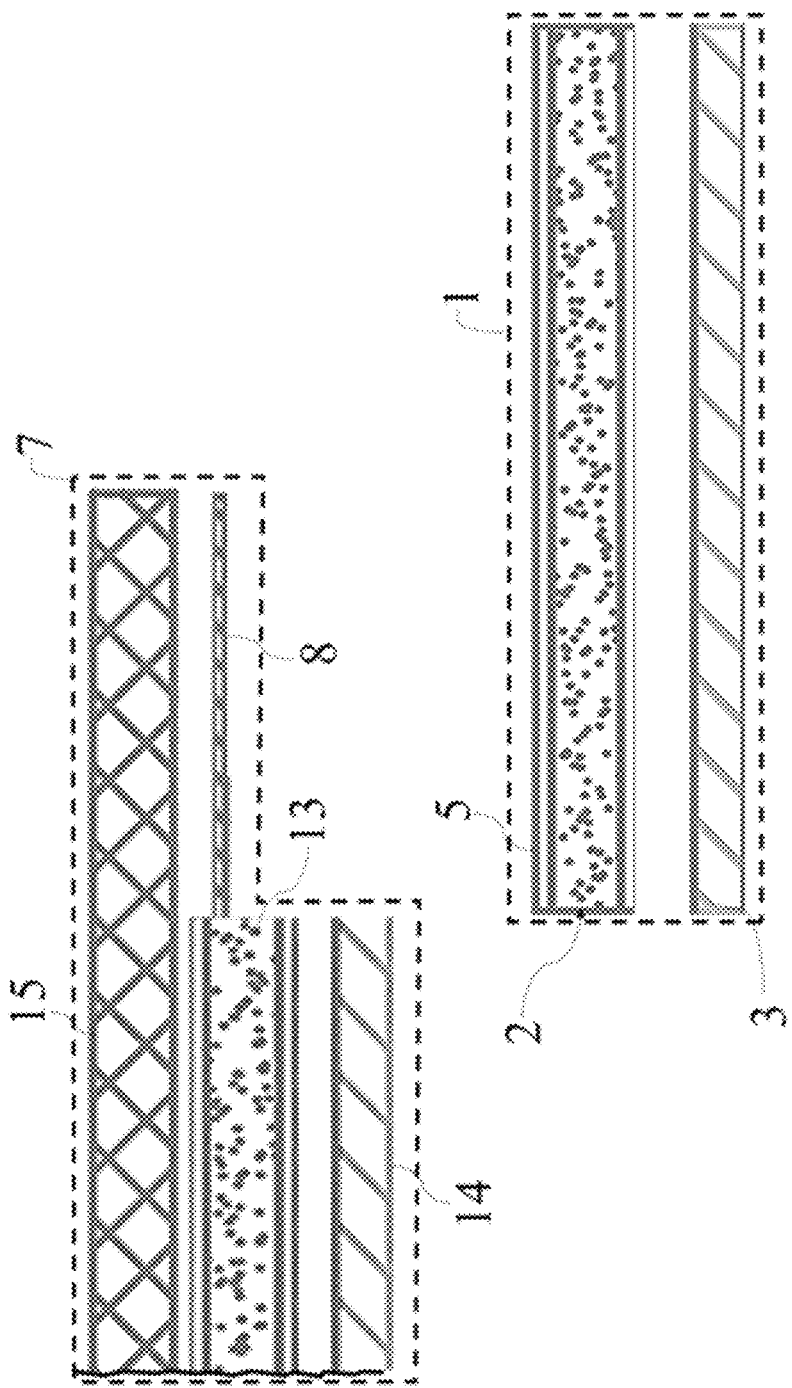
FIG. 9 shows a section view of an exploded detail view of a flooring panel and a spacer panel, according to aspects of this disclosure.
Figure 10:
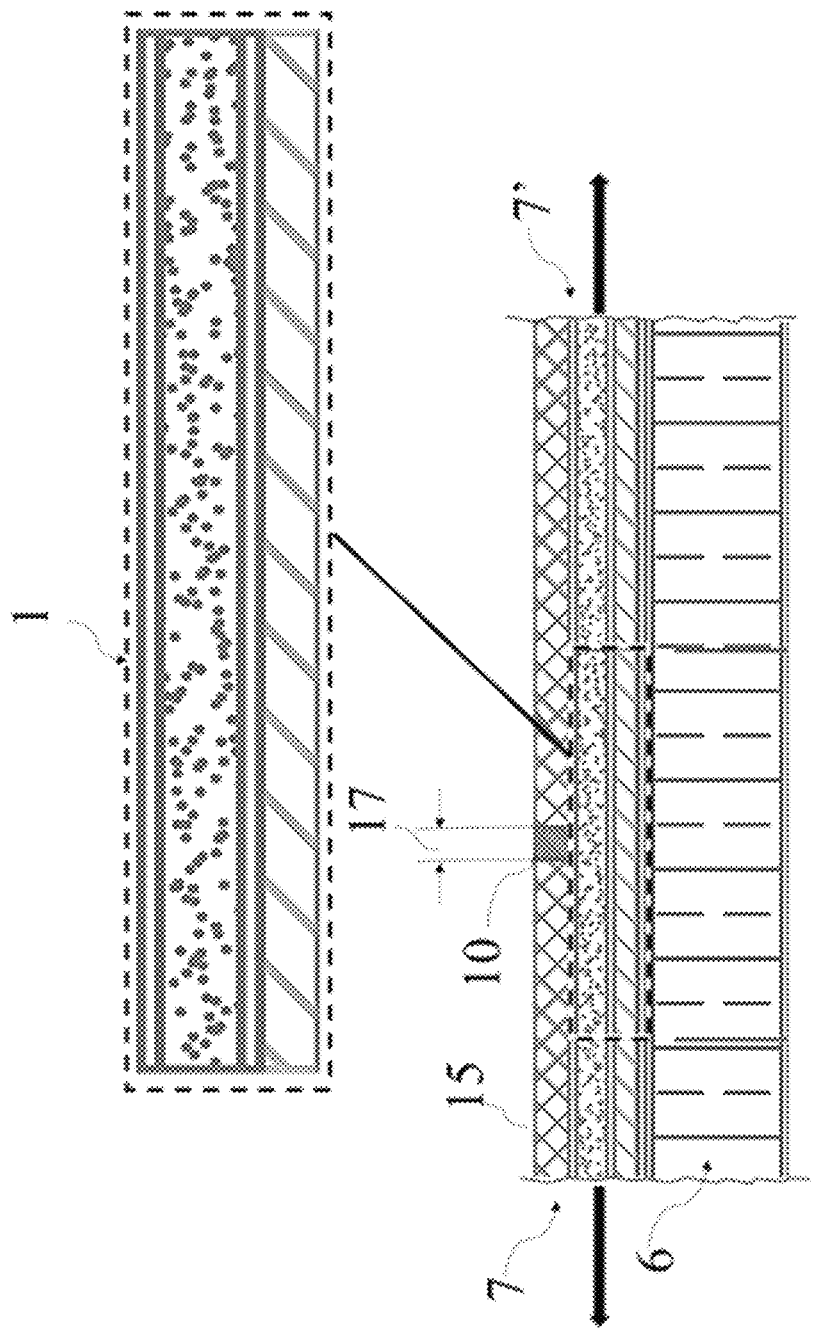
FIG. 10 shows a section view of two flooring panels, a sealant member, and a spacer panel, where the flooring panels and the spacer panel are formed by a plurality of layers, according to aspects of this disclosure.

Referring to FIG. 9, the spacer panel 1 has a top face 5 operatively disposed to receive the flooring panel 7, and a bottom face 4 that can slide over the structural floor 6. Additionally, the spacer panel 1 may be a laminated panel having a bottom layer 3 bonded to a core layer 2. In this embodiment, the top face 5 corresponds to an upper surface of the core layer 2, and the bottom face 4 corresponds to a lower face to the bottom layer 3.

Figure 8:
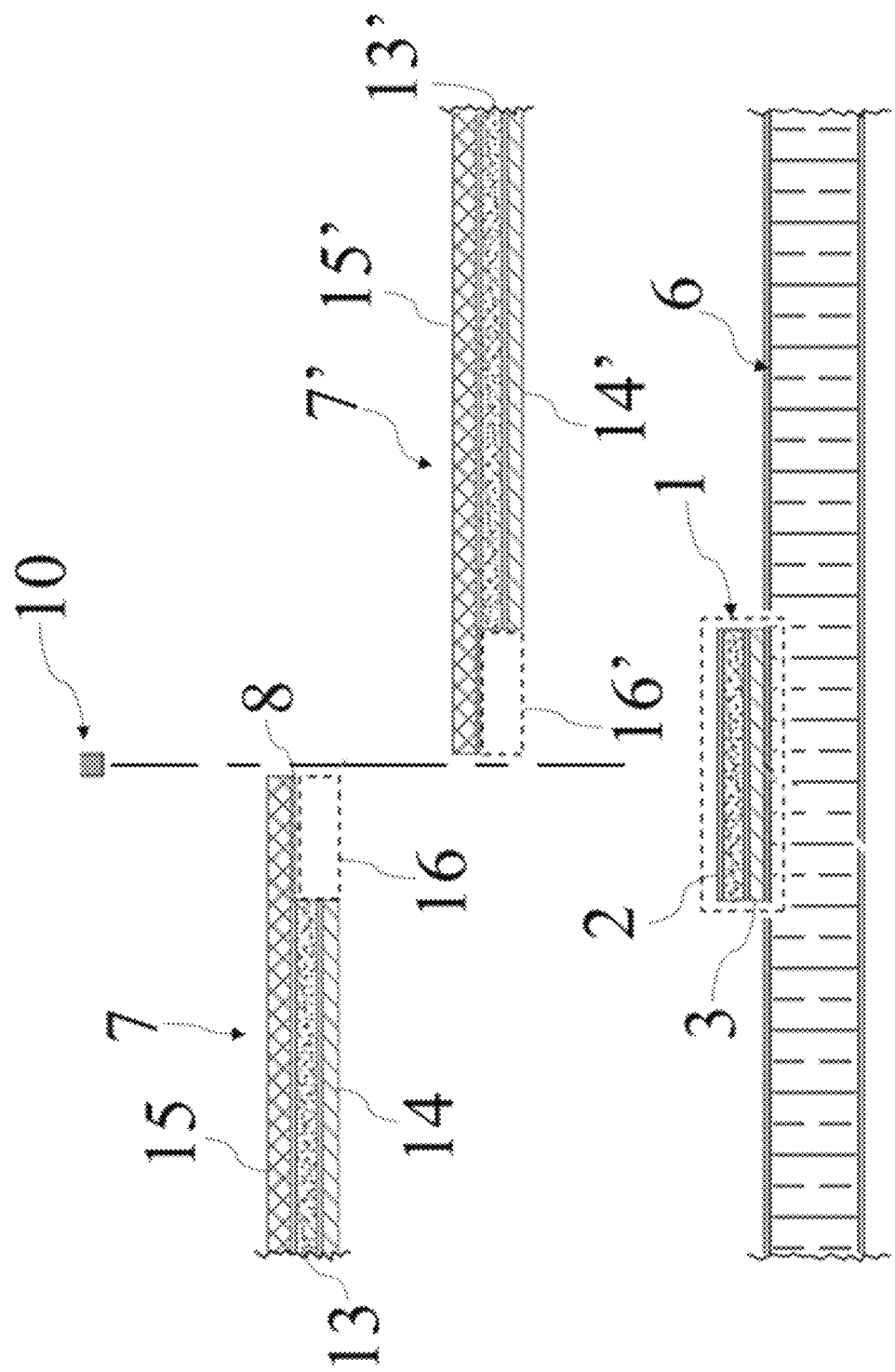
FIG. 8 shows a section view of two flooring panels, a sealant member, and a spacer panel, where the flooring panels and the spacer panel are formed by a plurality of layers, according to aspects of this disclosure.

Referring to FIG. 8, the spacer panel 1 allows the connection of two or more flooring panels 7 of an aircraft flooring. The spacer panel 1 can slide over a structural floor 6 of an aircraft or other vehicle. In this manner, the spacer panel allows building vehicle flooring that can slide monolithically over the structural floor of the vehicle, especially where the flooring uses a system such as the one described in the co-pending U.S. patent application Ser. No. 16/590,038. The structural floor 6 of an aircraft may be supported by a plurality structural beams of the fuselage. When the aircraft flooring is installed, the spacer panel 1 may be first installed in the structural floor 6. Later, the flooring panels 7 may be connected to the spacer panel 1.

Referring to FIG. 8 and FIG. 9, at least one flooring panel 7 may be connected to the core layer 2 by an adhesive material 8. The adhesive material 8 fixes or otherwise adheres the flooring panel 7 to the core layer 2 producing a monolithic body formed by the flooring panel 7 and the spacer panel 1.

The adhesive material 8 may be an adhesive such as, for example, a silicone adhesive, a polymer adhesive, acrylonitrile, an acrylic adhesive, cyanoacrylate, an epoxy resin, an epoxy putty, ethylene-vinyl acetate (EVA), polyvinyl butyral (PVB), polyvinyl acetate (PVA), a polyester resin, a polysulfide, polyurethane, polyvinyl alcohol, polyvinyl chloride (PVC), a polyurethane tape, a butyl rubber tape, a neoprene adhesive, a urethane adhesive, and/or combinations thereof.

In some cases, the adhesive material 8 may be a butyl rubber tape having adhesive on both faces. The adhesive may be deposited on a polyethylene backing. Additionally, each face of the tape may be protected by a backing layer, which is removed when installing the adhesive material 8 to the flooring panel 7 and the spacer panel 1.

Referring to FIG. 8 and FIG. 9, each spacer panel 1 can be formed using a composite architecture and materials similar to each flooring panel 7 as illustrated in co-pending U.S. patent application Ser. No. 16/590,038. The flooring panel 7 may be formed by a lower layer 14, an upper layer 15, and a core ply 13 bonded to the lower layer 14 and the upper layer 15. The upper layer 15 may serve as the floor surface of the aircraft flooring system within the fuselage of the aircraft. Accordingly, it may be desirable for the upper layer 15 to include anti-slip patterns, anti-slip coatings, anti-scratching coatings or combinations thereof. Similarly, the upper layer may include a real organic material or engineered material with the appearance of a finished surface, such as carpeting, plastic tiles, wood tiles, and/or another finish surface. In some cases, the finished surface could be pre-installed as part of the upper layer 15, for example, at the moment of manufacturing of the flooring panel 7.

In some cases, the lower layer 14 and the upper layer 15 of the flooring panel 7 and/or the bottom layer 3 of the spacer panel 1 may be made of a material selected from one or more of aramid fiber composites, carbon fiber composites, fiberglass composites, thermoplastic elastomers, EPDM, polyamides (PA) (e.g. PA12, PA6, PA66), polyetheretherketone (PEEK), thermosetting polyimides, polyamide-imide (PAI), polychlorotrifluoroethylene (PCTFE), polytetrafluoroethylene (PTFE), polymethylmethacrylate (PMMA), polyvinyl chloride (PVC), chlorinated polyvinyl chloride (CPVC), vinylidene polyfluoride (PVDF), ethylene-chlorotrifluoroethylene (ECTFE), cross-linked polyethylene (PEX) copolymers thereof, and/or combinations thereof.

For example, the upper layer 15 may be a fiber reinforced laminate, such as a laminated material of aramid fibers bonded together with epoxy resin, carbon fibers bonded together with epoxy resin, or fiberglass fibers bonded together with polymeric resins (e.g. unsaturated polyester resins, saturated polyester resins, orthoftalic polyester resins, isophthalic polyester resins, vinyl ester resins, urethane-acrylic resins). In some cases, the fibers may be provided in mats (e.g. woven mats, stitch-bonded mats, agglutinant bonded mats) or as cut fibers.

The fiber reinforced laminates may be manufactured using one or more methods, such as comprising hand layup, resin transfer molding (RTM), vacuum-assisted resin transfer molding (VARTM), spray-up, vacuum infusion processing, closed cavity bag molding (CCBM), autoclave processing, compression molding, pultrusion, or combinations thereof.

The fiber reinforced laminates are usually selected for aeronautic applications because they provide a high relation of resistance/weight in comparison with metal panels or solid polymer panels.

In some cases, the core layer 2 and the core ply 13 are materials that provide improved stiffness to the panels 1 and 7 because they make the panel 1 and 7 thicker without adding a significant weight in comparison with the material of the layers 3, 14, and 15. Accordingly, a thicker panel 1 and 7 may haves a greater moment of inertia, hence a greater stiffness.

The core layer 2 and the core ply 13 are made of a low weight material such as, for example, a non-woven polyester textiles, non-woven polyester textiles including microbeads and perforations (e.g. Coremat®, VitelMat®), pressure stable polyester non-woven textiles having channels (e.g. Soric®), polyethylene foams, polyvinyl chloride (PVC) foams, polymethacrylimide foams, honeycomb core materials (e.g. aluminum, nomex), and combinations thereof.

For example, during the manufacturing process of the flooring panel 7, the lower layer 14 and the upper layer 15 can be laminated with the core ply 13 by processes such as RTM, vacuum infusion processing, and autoclave processing. In these processes are recommended using as core plies (13) materials such as, for example, pressure stable polyester non-woven textiles having channels (e.g. Soric®), polyethylene foams, polyvinyl chloride (PVC) foams, and polymethacrylimide foams. The materials allows an even flow of resins e.g. polyester, vinyl ester, acrylic, epoxy inside closed molds in order to distribute the resins along the core ply 13 to cover reinforcement materials, such as aramid, carbon or glass fibers.

The flooring panel 7 may include veils applied to the molds during the laminating process. The veils may provide a smooth finish to the upper layer 15. Additionally, the upper layer 15 may include an anti-slip pattern, such as a grit pattern, squares pattern, dots pattern, or another high relief patterns or low relief patterns. In this case, a mold of the flooring panel 7 may have a low relief pattern or a high relief pattern to form the anti-slip pattern of the upper layer 15. Accordingly, the veils allow having an even coverage of the low relief pattern or high relief pattern in the mold, which is important to avoid having fragile edges in the anti-slip pattern of the upper layer 15, which may be produced by a high concentration of resin without reinforcement.

Similarly, during the manufacturing process of the spacer panel 1, the core layer 2 and a bottom layer 3 can be laminated together by processes such as RTM, vacuum infusion processing, and autoclave processing. In these processes, using core layer 2 materials such as pressure stable polyester non-woven textiles having channels (e.g. Soric®), polyethylene foams, polyvinyl chloride (PVC) foams, and polymethacrylimide foams may be recommended. The materials allows an even flow of resins (e.g. polyester, epoxy) inside closed molds in order to distribute the resins along the core layer 2 to cover reinforcement materials, such as aramid, carbon or glass fibers.

In some cases, the bottom layer 3 and/or the lower layer 14 may be made of an elastomeric-thermoplastic panel (e.g. Isodamp® panel). This type of bottom layer 3 may provide acoustical and vibration isolation.

In some cases, the flooring panels 7 can be made of a laminated sandwich of a lower layer 14, and an upper layer 15 and a core ply 13. The lower layer 14 is made of an elastomeric-thermoplastic panel, and the upper layer 15 is made of wood. The core ply 13 itself may be made of a laminated sandwich material of PVC foam cured between sheets of woven fiberglass fabric pre-impregnated in epoxy resin.

Accordingly, the upper layer 15 may be manufactured using a material selected from one or more of bamboo, cork, hardwood, laminated wood, engineered wood, plywood, and combinations thereof.

Figure 11:
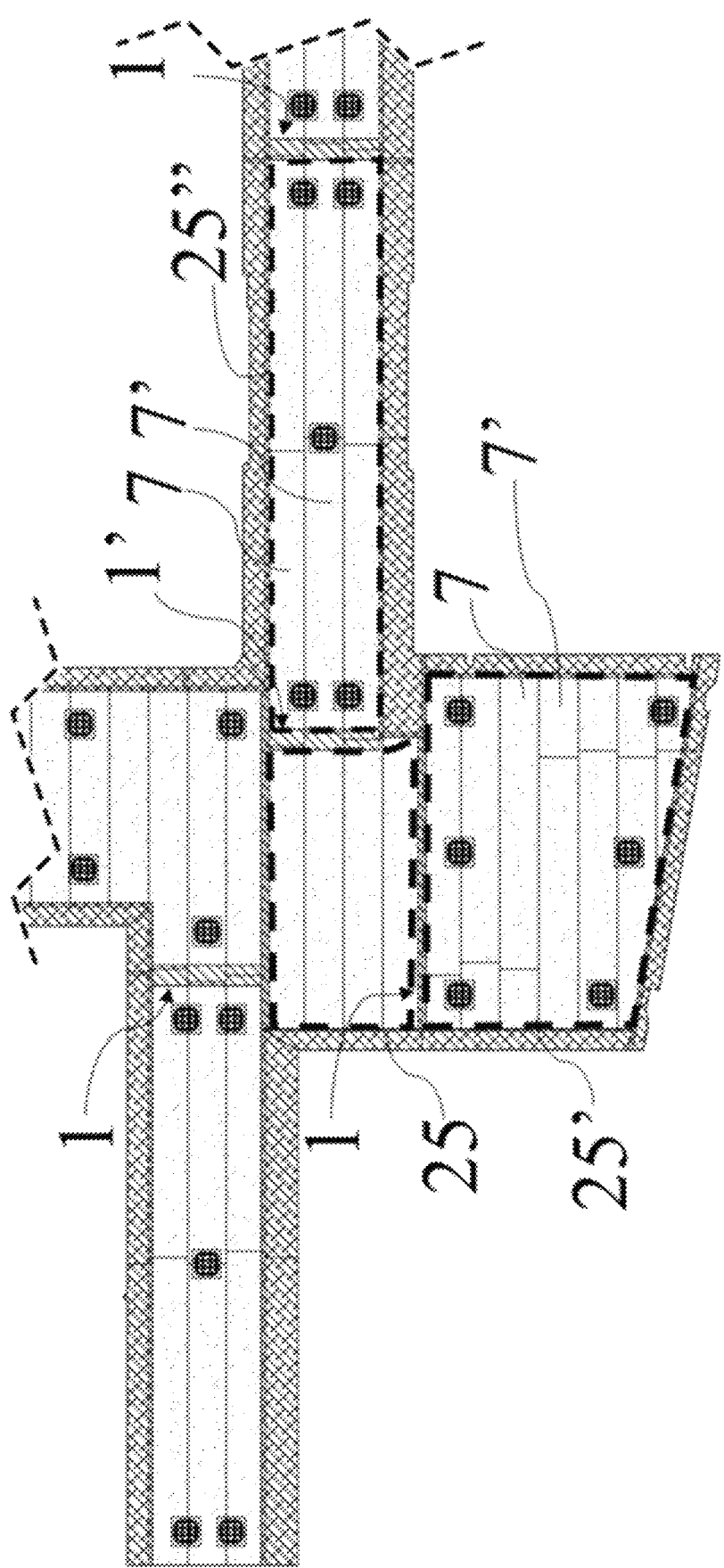
FIG. 11 shows a bottom view of flooring sections attached together with spacer panels, according to aspects of this disclosure.

In some cases, the spacer panel 1 may connect two contiguous flooring sections 25 and 25' as shown in FIG. 11. The flooring sections 25 and 25' may be formed by a plurality of flooring panels 7 and 7'. The spacer panel 1 may have a length that is long enough to cover a portion of an edge or an entire edge of the flooring sections 25 and 25'. Accordingly, a single spacer panel 1 can connect several flooring panels 7 and 7' as shown in FIG. 11. One advantage of this configuration is that the spacer panel 1 can provide stiffness to the joint of the contiguous flooring sections 25 and 25', because of an avoidance of a plurality of spacer panels 1 that would be located between each contiguous flooring panels 7 and 7', which would produce a plurality of discontinuities. Additionally, a single spacer panel 1 is easier to install and remove in comparison with a plurality of spacer panels 1.

The single spacer panel 1 may provide a rigid connection between the flooring sections 25 and 25' forming a monolithic flooring assembly that floats and displaces horizontally thanks to the operation of a plurality of evenly distributed floor pucks 9, such as the floor pucks described in the co-pending U.S. patent application Ser. No. 16/590,038.

In some cases, the flooring assembly may be installed in other places or vehicles such as, for example, pressurized rooms, pressurized vessels, submarines, spaceships, helicopters, boats, ships, and other places or vehicles submitted to compression and de-compression, pressurization or forces generated by high speeds and accelerations G-forces.

EXAMPLES

Example 1

In some cases, such as with reference to FIG. 9, the spacer panel 1 is manufactured by laminating a core layer 2 to the bottom layer 3. The core layer 2 is made of a laminated sandwich material of PVC foam cured between sheets of woven fiberglass fabric pre-impregnated in epoxy resin. The bottom layer 3 is made of an elastomeric-thermoplastic acoustic dampening panel.

In some cases, such as with FIG. 8, the spacer panel 1 is placed over the structural floor 6 of the aircraft and connected to two flooring panels 7 and 7'. The flooring panels 7 and 7' are made of a laminated sandwich of a lower layer 14, and an upper layer 15 and a core ply 13. The upper layer 15 is made of wood. The lower layer 14 is made of an elastomeric-thermoplastic acoustic dampening panel. The core ply 13 is made of a laminated sandwich material of PVC foam cured between sheets of woven fiberglass fabric pre-impregnated in epoxy resin.

In some cases, such as with reference to FIG. 7, each flooring panel 7 and 7' has cut sections 16 and 16', each cut section 16 and 16' is located in an edge, where the cut sections 16 and 16' are collinear between them. Each cut section 16 and 16' extends inwardly from the edge a distance of about 12.7 mm. In some cases, the spacer panel 1 has a length measured in the direction parallel to the distance of the cut section 16, where the length is about 27.7 mm. Accordingly, the flooring panels 7 and 7' form a gap 17 of about 2.28 mm. In the gap 17, a sealant member 10 is applied as an extruded PVC grout.

Additionally, the spacer panel 1 and the flooring panels 7 and 7' are bonded together with an adhesive material 8, which is a butyl rubber tape having adhesive on both faces.

Example 2

In some cases, such as with reference to FIG. 11, a spacer panel 1 is installed between two adjacent flooring sections 25 and 25'. The spacer panel 1 is connected to a pair of flooring panels 7 and 7' through a longitudinal edge. Referring to FIG. 5, a gap 17 is formed between the flooring panels 7 and 7', where the gap 17 is about 3 mm. In the gap 17, the sealant member 10 may be applied as an extruded PVC grout. The spacer panel 1 dimensions are about 860 mm×152 mm×12.5 mm.

Example 3

In some cases, such as with reference to FIG. 11, a spacer panel 1' is installed between two adjacent flooring sections 25 and 25". The spacer panel 1' is connected to an edge of the flooring sections 25 and 25" that is formed by a plurality of transversal edges of the flooring panels 7 and 7'.

Between flooring sections 25 and 25" is formed a gap 17' of about 3.5 mm (not illustrated). In the gap 17, a sealant member 10 is applied as an extruded PVC grout (not illustrated). The spacer panel 1 dimensions are about 460 mm×152 mm×12.5 mm.

It should be understood that the present invention is not limited to the examples described and illustrated, as it will be evident to a person skilled in the art that there are variations and possible modifications that do not depart from the spirit and/or scope of the disclosure.

The invention claimed is:

1. A spacer assembly for flooring, comprising:
 a flooring panel located on a structural floor; and
 a spacer panel having:
  a top face operatively disposed to receive the flooring panel, wherein an entirety of the top face that is adjacent to a lower surface of the flooring panel is in physical contact with the lower surface of the flooring panel and a cut section of the spacer panel comprises a regular polygonal shape; and
  a bottom face located on the structural floor, wherein the flooring panel and the bottom face of the spacer panel slide over the structural floor relative to the structural floor during movements of a vehicle enclosing the structural floor.

2. The spacer assembly of claim 1, wherein the flooring panel is connected to the spacer panel by an adhesive material.

3. The spacer assembly of claim 1, wherein the flooring panel is connected to the spacer panel by an adhesive tape.

4. The spacer assembly of claim 1, wherein the flooring panel includes a cut section located along an edge, wherein the cut section is configured to receive the spacer panel.

5. The spacer assembly of claim 1, comprising:
 a first flooring panel; and
 a second flooring panel, wherein the first flooring panel and the second flooring panel are connected to the spacer panel.

6. The spacer assembly of claim 5, comprising:
 a sealant member located between the first flooring panel and the second flooring panel.

7. The spacer assembly of claim 6, wherein the sealant member comprises one or more of polyvinyl chloride, extruded polyvinyl chloride, extruded polymers, thermoplastic resins, epoxy resins, silicone, elastomeric gaskets, or combinations thereof.

8. The spacer assembly of claim 6, wherein the sealant member comprises one or more of natural rubber, polyisoprene, polybutadiene, styrene-butadiene rubber, butyl rubber, or nitrile rubber.

9. The spacer assembly of claim 6, wherein the sealant member is a grout, which is applied between the flooring panels.

10. A spacer assembly for flooring, comprising:
 a first flooring panel located on a structural floor of a vehicle; and
 a spacer panel having:
  a top face operatively disposed to receive the first flooring panel, wherein an entirety of the top face that is under the first flooring panel is in physical contact with a bottom surface of the first flooring panel and wherein a cut section of the spacer panel comprises a regular polygon; and
  a bottom face adjacent to the structural floor, wherein the first flooring panel and the bottom face of the spacer panel remain capable of sliding over the structural floor when the first flooring panel moves relative to the structural floor during movements of the vehicle.

11. The spacer assembly of claim 10, wherein the vehicle is an aircraft.

12. The spacer assembly of claim 10, wherein the vehicle is a watercraft.

13. The spacer assembly of claim 6, wherein removal and/or installation of the second flooring panel is independent to installation and/or removal of the first flooring panel.

14. The spacer assembly of claim 1, wherein the spacer panel allows for connecting or disconnecting the flooring panel independently from a contiguous element that is overlapping or adjacent to the flooring panel.

* * * * *